(12) United States Patent
Winsor

(10) Patent No.: US 7,530,221 B2
(45) Date of Patent: May 12, 2009

(54) INTERNAL COMBUSTION ENGINE INCLUDING DUAL PARTICULATE FILTER WITH ASH ACCUMULATION RECEPTACLE

(75) Inventor: Richard Edward Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 8 days.

(21) Appl. No.: 11/444,693

(22) Filed: Jun. 1, 2006

(65) Prior Publication Data
US 2007/0277512 A1 Dec. 6, 2007

(51) Int. Cl.
*F01N 3/00* (2006.01)
(52) U.S. Cl. .............................. 60/297; 60/286; 60/287; 60/292; 60/295; 60/296; 60/311
(58) Field of Classification Search .................. 60/274, 60/278, 280, 286, 287, 291, 292, 295, 296, 60/297, 311, 324
See application file for complete search history.

(56) References Cited
U.S. PATENT DOCUMENTS 5,426,936 A * 6/1995 Levendis et al. .............. 60/278
5,566,545 A * 10/1996 Hijikata et al. ................. 60/274
5,930,995 A * 8/1999 Watanabe et al. .............. 60/311
6,233,926 B1 * 5/2001 Bailey et al. ................... 60/295
6,405,528 B1 * 6/2002 Christen et al. ............... 60/295
6,829,890 B2 * 12/2004 Gui et al. ....................... 60/295
6,874,315 B2 * 4/2005 Nakatani et al. .............. 60/285
6,978,604 B2 * 12/2005 Wang et al. ................... 60/297
6,989,045 B2 * 1/2006 Bailey et al. .................. 95/129

FOREIGN PATENT DOCUMENTS

JP 04339119 A * 11/1992 ................... 60/295

* cited by examiner

*Primary Examiner*—Binh Q. Tran

(57) ABSTRACT

An internal combustion engine includes a first set of combustion cylinders, a second set of combustion cylinders, and a turbocharger having a turbine. A first particulate filter includes a bottom inlet in communication with the first set of combustion cylinders, a top outlet in communication with the turbine, and a generally vertically upward flow path through the first particulate filter inlet. A second particulate filter includes a bottom inlet in communication with the second set of combustion cylinders, a top outlet in communication with the turbine, and a generally vertically upward flow path through the second particulate filter inlet. An ash accumulation receptacle is positioned generally below each of the first particulate filter inlet and the second particulate filter inlet.

16 Claims, 3 Drawing Sheets

INTERNAL COMBUSTION ENGINE INCLUDING DUAL PARTICULATE FILTER WITH ASH ACCUMULATION RECEPTACLE

FIELD OF THE INVENTION

The present invention relates to internal combustion engines, and, more particularly, to a method and apparatus for filtering particulates from an exhaust stream in such an internal combustion engine.

BACKGROUND OF THE INVENTION

In order to meet future particulate emission standards for internal combustion (IC) engines, in particular diesel engines, manufacturers of diesel engines are using particulate filters (also referred to as particulate traps). Such particulate filters are typically placed downstream of the turbocharger turbine and remove solid particulate matter before it exits the exhaust system to the ambient environment. After a particulate filter collects particulates for a period of time, increasing the exhaust temperature to a suitable level cleans the filter (also known as regenerating) since the oxygen in the exhaust burns the accumulated carbon in the filter.

Particulate filters for diesel engines are typically relatively large and expensive, and regeneration under light load conditions is problematic because attaining the necessary exhaust temperature is difficult. The use of particulate filters for diesel engines operating under varying load conditions therefore is quite limited. Even when the filter is regenerated, non-combustible ash which accumulates in the filter remains after regeneration, decreasing the efficiency of the filter.

What is needed in the art is a diesel engine which uses a particulate filter to remove solid particulate matter from the exhaust emissions, which effectively removes both combustible and non-combustible particulates from the filter.

SUMMARY OF THE INVENTION

The invention comprises, in one form thereof, an internal combustion engine including a first set of combustion cylinders, a second set of combustion cylinders, and a turbocharger having a turbine. A first particulate filter includes a bottom inlet in communication with the first set of combustion cylinders, a top outlet in communication with the turbine, and a generally vertically upward flow path through the first particulate filter inlet. A second particulate filter includes a bottom inlet in communication with the second set of combustion cylinders, a top outlet in communication with the turbine, and a generally vertically upward flow path through the second particulate filter inlet. An ash accumulation receptacle is positioned generally below each of the first particulate filter inlet and the second particulate filter inlet.

The invention comprises, in another form thereof, an internal combustion engine including a plurality of combustion cylinders, and a turbocharger having a turbine. Each of one or more particulate filters includes a bottom inlet in communication with a set of the plurality of combustion cylinders, a top outlet in communication with the turbine, and a generally vertically upward flow path through the inlet. An ash accumulation receptacle is positioned generally below each inlet.

DETAILED DESCRIPTION OF THE INVENTION

Figure 1:
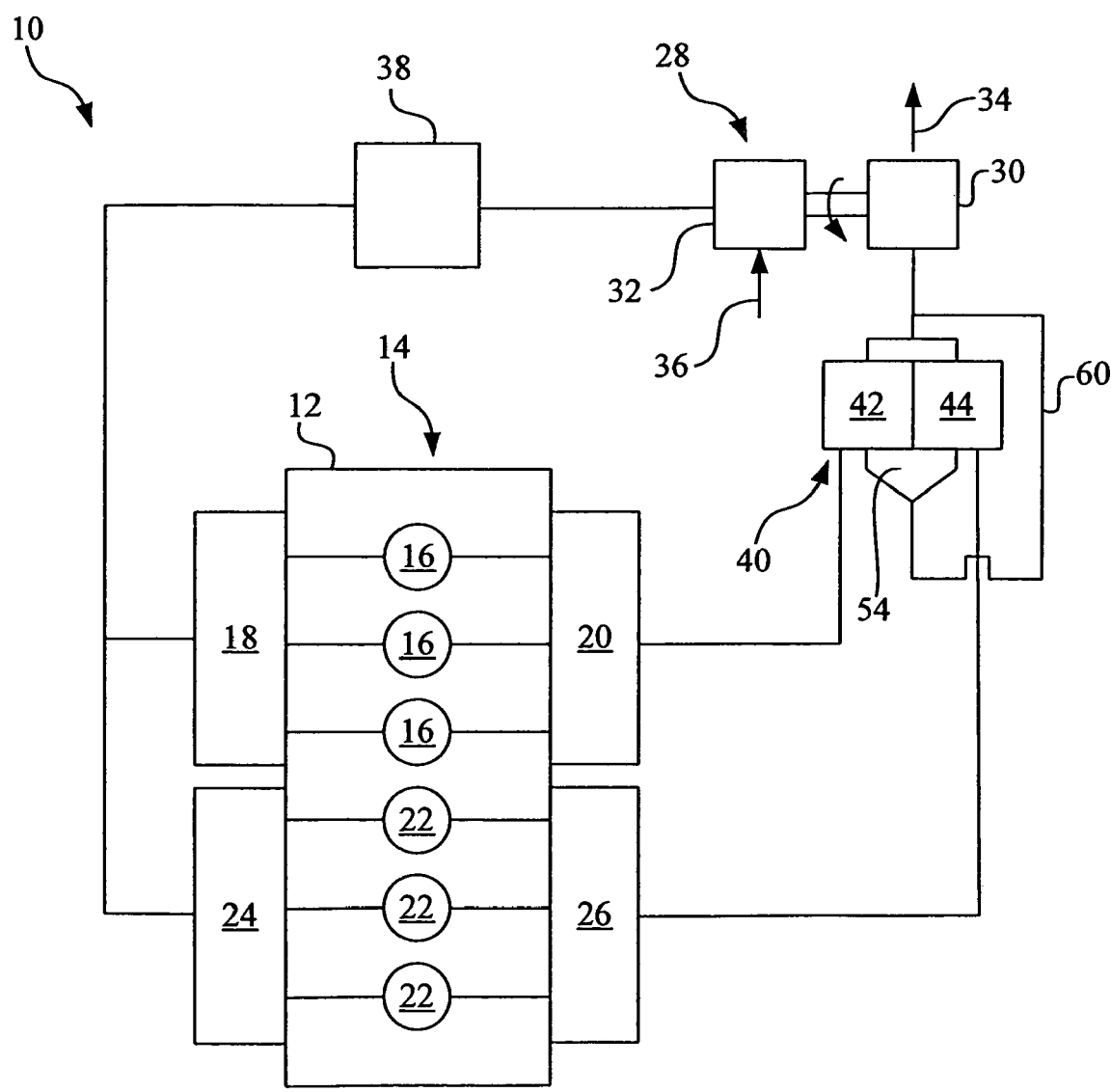
FIG. 1 is a schematic view of an embodiment of an internal combustion engine of the present invention.

Referring now to the drawings, there is shown an embodiment of an IC engine 10 of the present invention, which generally includes a block 12 defining a plurality of combustion cylinders 14. In the embodiment shown, IC engine 10 is a diesel engine including six combustion cylinders 14, but may include a different number of combustion cylinders, such as eight, ten, twelve, etc. The plurality of combustion cylinders 14 includes a first set of combustion cylinders 16 which are in communication with an intake manifold 18 and an exhaust manifold 20; and a second set of combustion cylinders 22 in communication with an intake manifold 24 and an exhaust manifold 26.

Exhaust manifolds 20 and 26 each have an exhaust outlet which is in fluid communication with a turbocharger 28 including a turbine 30 which rotatably drives a compressor 32. The spent exhaust gas exits turbine 30 and is exhausted to the ambient environment, as indicated by arrow 34.

Compressor 32 receives combustion air from the ambient environment, as indicated by line 36, and provides compressed combustion air to intake manifolds 18 and 24. The compressed combustion air is heated as a result of the work during the compression operation, and is cooled by an aftercooler 38 located downstream from compressor 32.

Figure 2:
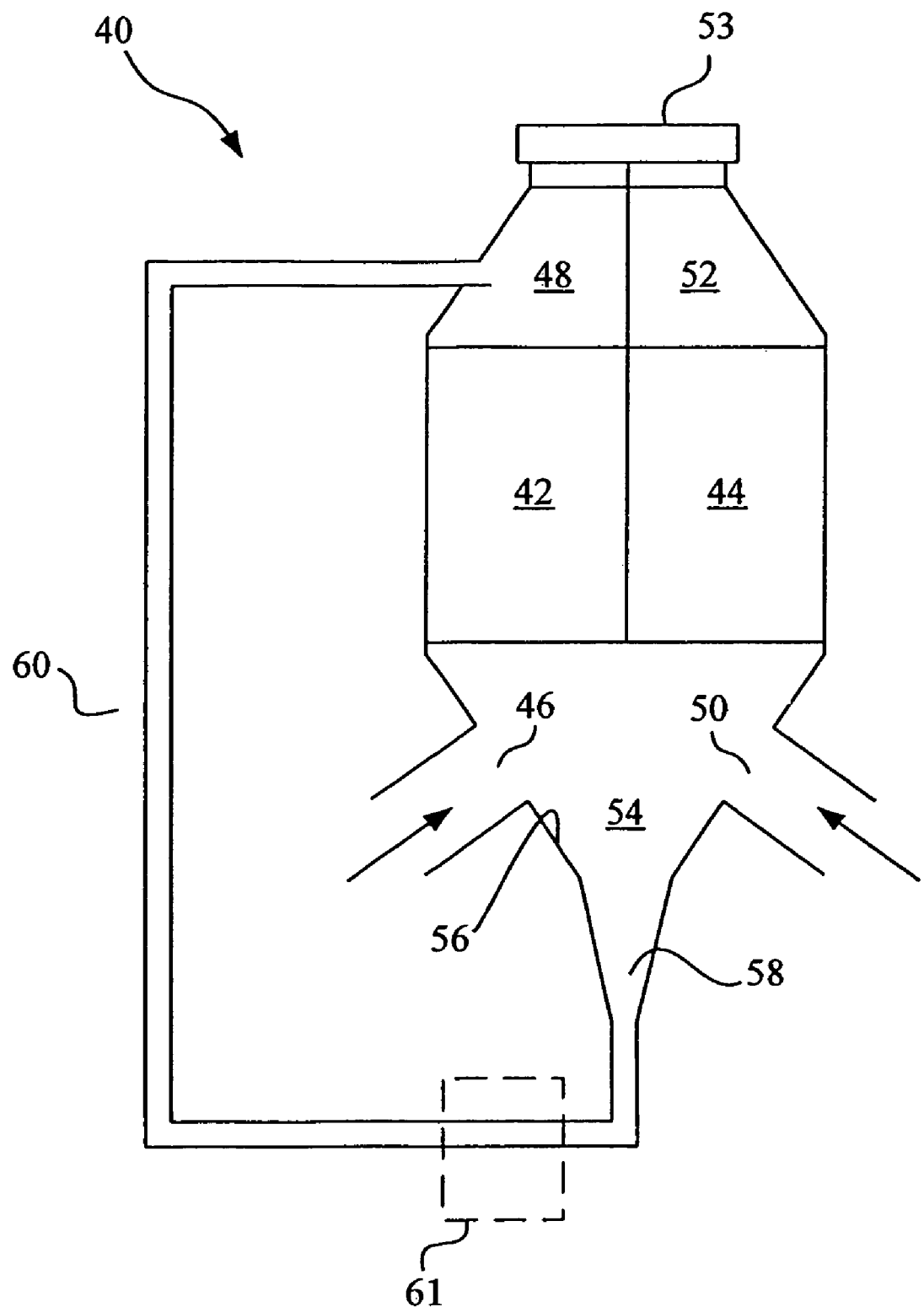
FIG. 2 is a side view of the dual particulate filter shown in FIG. 1.
Figure 3:
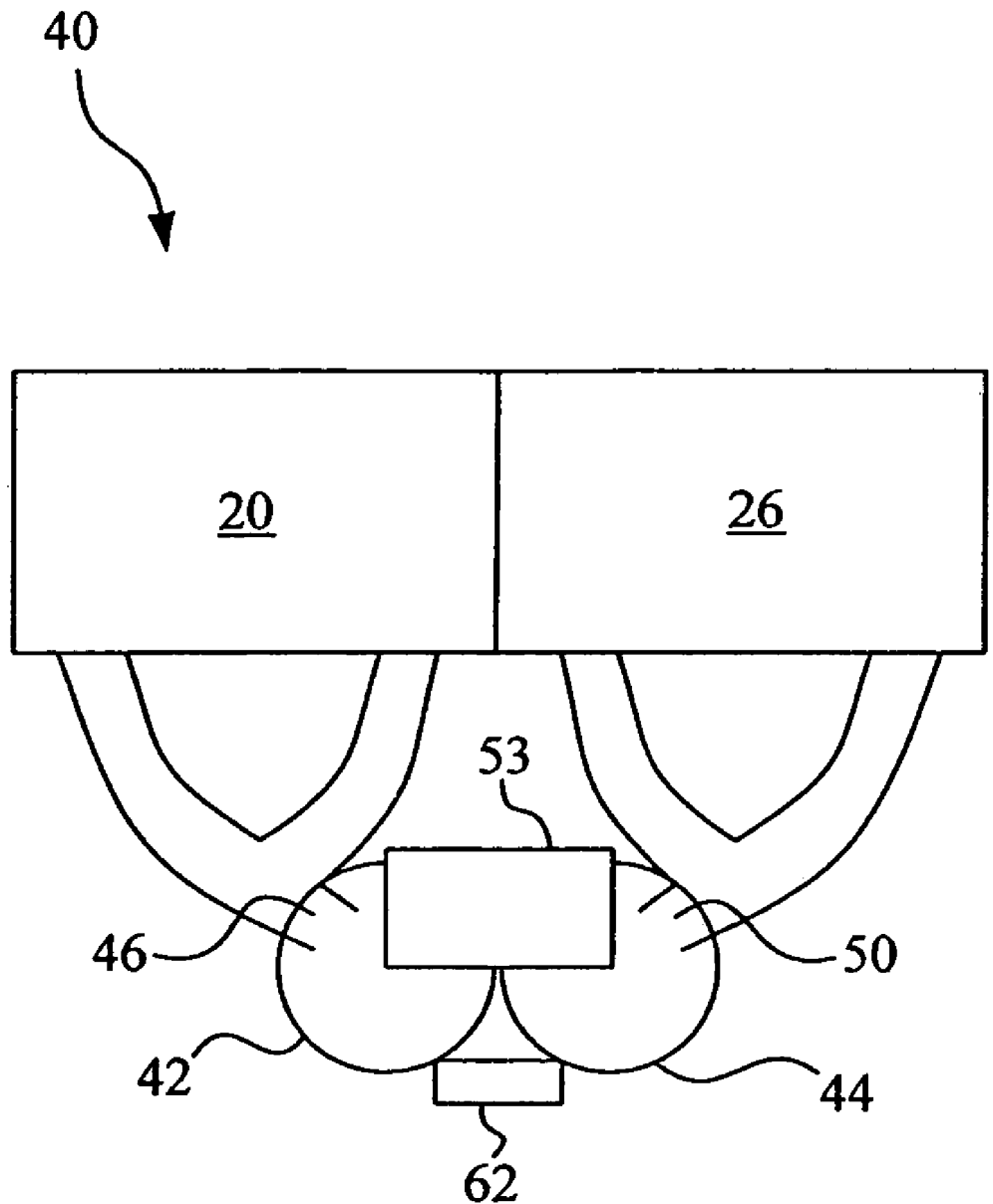
FIG. 3 is a top view of the dual particulate filter shown in FIGS. 1 and 2.

According to an aspect of the present invention, and referring to FIGS. 1-3 conjunctively, a dual particulate filter 40 includes a first particulate filter 42 which is in fluid communication between first set of combustion cylinders 16 and turbine 30, and a second particulate filter 44 which is in fluid communication between second set of combustion cylinders 22 and turbine 30. Each particulate filter 42 and 44 filters particulates from the exhaust streams which are exhausted from exhaust manifolds 20 and 26, respectively.

Particulate filter 42 includes a bottom inlet 46 in communication with combustion cylinders 16 and 22, a top outlet 48 in communication with turbine 30, and a generally vertically upward flow path through inlet 46. Similarly, particulate filter 44 includes a bottom inlet 50 in communication with combustion cylinders 16 and 22, a top outlet 52 in communication with turbine 30, and a generally vertically upward flow path through inlet 50. Each inlet 46, 50 is oriented at an acute angle relative to the generally vertical flow path through the respective particulate filter 42, 44. Each outlet 48 and 52 terminates at a mounting foot 53 allowing mounting to a turbine inlet of turbocharger 28.

It will be appreciated that the flow path may deviate somewhat from vertical through each particulate filter 42 and 44, but the general flow path is in a vertically upwards direction. This allows non-combustible ash to fall from each particulate filter 42 and 44 when IC engine 10 is turned off. Ash accumulation receptacle 54 is positioned at a bottom of each particulate filter 42 and 44, below inlets 46 and 50, for receiving the falling ash. Ash accumulation receptacle 54 can be a fixed, non-removable receptacle as shown, or can be removable such as a removable tray. Ash accumulation receptacle 54 includes a sloped floor 56 terminating at an outlet 58. Outlet 58 is coupled with a bypass 60, configured as a pipe in the embodiment shown, which in turn is coupled with a downstream side of dual particulate filter 40. The higher pressure at the upstream side of filter inlets 46 and 50 causes accumulated ash to bypass around particulate filters 42 and 44 during operation of IC engine 10. An optional valve 61, shown in dashed lines in FIG. 2, allows controllable bypassing of ash through bypass 60. For example, valve 61 could be opened at start-up of IC engine 10 and closed during normal operation.

To further assist in removal of non-combustible ash from particulate filters 42 and 44, an optional vibrator 62 (FIG. 3) vibrates particulate filters 42 and 44 when IC engine 10 is turned off. Vibrator 62 is engaged or coupled with particulate filters 42 and 44, but can have any suitable shape depending upon the configuration of particulate filters 42 and 44.

During operation of IC engine 10, first particulate filter 42 filters particulates from combustion cylinders 16 and 22, and second particulate filter 44 also filters particulates from combustion cylinders 16 and 22. When IC engine is turned off, ash falls into ash accumulation receptacle 54. Optional vibrator 62 can be used to further assist in removal of ash from dual particulate filter 40. When IC engine is again turned on, the accumulated ash bypasses around dual particulate filter 40 through bypass 60. First particulate filter 42 and/or second particulate filter 44 also can be regenerated (i.e., cleaned) using conventional regenerating techniques.

In the embodiment shown, each particulate filter 42 and 44 is coupled with a common turbocharger 28. However, it is also possible to couple each particulate filter 42 and 44 with a separate turbocharger. Further, in the embodiment shown, turbocharger 28 is assumed to be configured as a variable geometry turbocharger (VGT), but may also be configured as a fixed geometry turbocharger.

Having described the preferred embodiment, it will become apparent that various modifications can be made without departing from the scope of the invention as defined in the accompanying claims.

The invention claimed is:

1. An internal combustion engine, comprising:
    a first set of combustion cylinders and a second set of combustion cylinders;
    a turbocharger including a turbine;
    a first particulate filter including a bottom inlet in communication with said first set of combustion cylinders, a top outlet in communication with said turbine, and a generally vertically upward flow path through said first particulate filter inlet;
    a second particulate filter including a bottom inlet in communication with said second set of combustion cylinders, a top outlet in communication with said turbine, and a generally vertically upward flow path through said second particulate filter inlet; and
    an ash accumulation receptacle positioned generally below each of said first particulate filter inlet and said second particulate filter inlet, said ash accumulation receptacle being positioned between said first and second sets of combustion cylinders and between the inlets to said first and second particulate filters, said first particulate filter inlet and said second particulate filter inlet being each oriented at an acute angle relative to said generally vertically upwards flow path.

2. The internal combustion engine of claim 1, wherein said first particulate filter has a generally vertically upwards flow path from said first particulate filter inlet to said first particulate filter outlet, and said second particulate filter has a generally vertically upwards flow path from said second particulate filter inlet to said second particulate filter outlet.

3. The internal combustion engine of claim 1, including a bypass in communication between said ash accumulation receptacle and a downstream side of said first particulate filter outlet and said second particulate filter outlet.

4. The internal combustion engine of claim 3, wherein said bypass comprises a pipe.

5. The internal combustion engine of claim 3, wherein said ash accumulation receptacle includes an outlet in communication with said bypass, and a floor sloping toward said outlet.

6. The internal combustion engine of claim 1, further including at least one vibrator associated with said first particulate filter and said second particulate filter.

7. The internal combustion engine of claim 1, wherein said first set of combustion cylinders includes at least 2 cylinders, and said second set of combustion cylinders includes at least 2 cylinders.

8. The internal combustion engine of claim 1, wherein said internal combustion engine comprises a diesel engine.

9. An internal combustion engine, comprising:
    a plurality of combustion cylinders;
    a turbocharger including a turbine;
    at least one particulate filter, each said particulate filter including a bottom inlet in communication with a set of said plurality of combustion cylinders, a top outlet in communication with said turbine, and a generally vertically upward flow path through said inlet; and
    an ash accumulation receptacle positioned generally below each said inlet, said ash accumulation receptacle being positioned between said combustion cylinders and the inlet to said particulate filter, wherein said at least one particulate filter includes a first particulate filter and a second particulate filter, said first particulate filter including a bottom inlet in communication with a first subset of said plurality of combustion cylinders, a top outlet in communication with said turbine, and a generally vertically upward flow path through said first particulate filter inlet; said second particulate filter including a bottom inlet in communication with a second subset of said plurality of combustion cylinders, a top outlet in communication with said turbine, and a generally vertically upward flow path through said second particulate filter inlet; said ash accumulation receptacle positioned generally below each of said first particulate filter inlet and said second particulate filter inlet, said first particulate filter inlet and said second particulate filter inlet being each oriented at an acute angle relative to said generally vertically upwards flow path.

10. The internal combustion engine of claim 9, wherein said first particulate filter has a generally vertically upwards flow path from said first particulate filter inlet to said first particulate filter outlet, and said second particulate filter has a generally vertically upwards flow path from said second particulate filter inlet to said second particulate filter outlet.

11. The internal combustion engine of claim 9, wherein said ash accumulation receptacle is positioned between said first particulate filter inlet and said second particulate filter inlet.

12. The internal combustion engine of claim 9, including a bypass in communication between said ash accumulation receptacle and a downstream side of said first particulate filter outlet and said second particulate filter outlet.

13. The internal combustion engine of claim 12, wherein said bypass comprises a pipe.

14. The internal combustion engine of claim 12, wherein said ash accumulation receptacle includes an outlet in communication with said bypass, and a floor sloping toward said outlet.

15. The internal combustion engine of claim 9, wherein said at least one particulate filter comprises two particulate filters, each said particulate filter inlet being in communication with a subset of said plurality of combustion cylinders.

16. The internal combustion engine of claim 9, further including at least one vibrator associated with said first particulate filter and said second particulate filter.

* * * * *